(12) United States Patent
Sadamura

(10) Patent No.: US 12,459,513 B2
(45) Date of Patent: Nov. 4, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Satoshi Sadamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 18/590,989

(22) Filed: Feb. 29, 2024

(65) Prior Publication Data
US 2024/0326813 A1    Oct. 3, 2024

(30) Foreign Application Priority Data

Mar. 30, 2023    (JP) .................................. 2023-055499

(51) Int. Cl.
| | |
|---|---|
| *B60W 30/18* | (2012.01) |
| *B60W 30/14* | (2006.01) |
| *B60W 50/00* | (2006.01) |
| *B60W 50/10* | (2012.01) |
| *B60W 60/00* | (2020.01) |

(52) U.S. Cl.
CPC .... *B60W 30/18145* (2013.01); *B60W 30/143* (2013.01); *B60W 50/0097* (2013.01); *B60W 50/10* (2013.01); *B60W 60/001* (2020.02); *B60W 2552/30* (2020.02)

(58) Field of Classification Search
CPC ......... B60W 30/18145; B60W 30/143; B60W 50/0097; B60W 50/10; B60W 60/001; B60W 2552/30
See application file for complete search history.

(56) References Cited

U.S. PATENT DOCUMENTS

| | | | |
|---|---|---|---|
| 8,180,542 B2* | 5/2012 | Takeda ............ | B60W 30/18145 701/70 |
| 9,834,185 B2* | 12/2017 | Tanase .................... | B60T 8/172 |
| 2009/0005945 A1* | 1/2009 | Takeda ............ | B60W 30/18145 701/70 |

(Continued)

FOREIGN PATENT DOCUMENTS

| | | |
|---|---|---|
| JP | 3464794 | 11/2003 |
| JP | 2006-131107 | 5/2006 |
| JP | 2009-006828 | 1/2009 |

OTHER PUBLICATIONS

Japanese Office Action for Japanese Patent Application No. 2023-055499 mailed Oct. 22, 2024.

*Primary Examiner* — Phutthiwat Wongwian
*Assistant Examiner* — Susan E Scharpf
(74) *Attorney, Agent, or Firm* — Amin, Turocy & Watson, LLP

(57) ABSTRACT

The vehicle control device controls an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

9 Claims, 14 Drawing Sheets

(56) References Cited

U.S. PATENT DOCUMENTS

| | | | |
|---|---|---|---|
| 2017/0072926 A1* | 3/2017 | Fukuda | B60W 10/06 |
| 2020/0047772 A1* | 2/2020 | Yasue | B60W 30/16 |
| 2020/0255007 A1* | 8/2020 | Tsuji | B60W 50/16 |
| 2022/0219656 A1* | 7/2022 | Asano | B60T 8/17616 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-055499, filed Mar. 30, 2023, the content of which is incorporated herein by reference.

BACKGROUND

Field of the Invention

The present invention relates to a vehicle control device, a vehicle control method, and a storage medium.

Description of Related Art

In recent years, efforts to provide sustainable transportation systems that take into account various situations have become active. In order to implement this, research and development are aimed to further improve traffic safety and convenience through research and development of driving assistance technology. For example, a curve notice device for noticing whether a curved road in front of a vehicle is a simple curved road, an S-shaped curve or a winding or zigzagging road is disclosed (Japanese Patent No. 3464794).

SUMMARY OF THE INVENTION

In conventional devices, a relationship between a driver's operation and a vehicle control process when a curved road is continuous has not been considered in detail. For this reason, it may not be possible to appropriately control the behavior of the vehicle in accordance with the driver's operation when the curved road is continuous.

The present invention has been made in consideration of such circumstances, and an objective of the present invention is to provide a vehicle control device, a vehicle control method, and a storage medium capable of appropriately controlling the behavior of a vehicle in accordance with a driver's operation when a curved road is continuous. For example, when the curved road is continuous and assistance control for performing one or both of deceleration of the vehicle and a notification (or warning) for the driver of the vehicle are performed and when the driver performs an operation to release the assistance control, appropriate control corresponding to the operation and the position of the vehicle can be performed to assist the driver in driving. By extension, it can contribute to the development of a sustainable transportation system by taking into account occupants.

A vehicle control device, a vehicle control method, and a storage medium according to the present invention adopt the following configurations.

(1): According to an aspect of the present invention, there is provided a vehicle control device including: a storage medium storing computer-readable instructions; and one or more processors connected to the storage medium, the processor executing the computer-readable instructions to: acquire curved road information about a curved road located in a travel direction of a vehicle; while the vehicle is traveling in a segment from an entrance to the curved road to a position a predetermined distance before the entrance or while the vehicle is traveling on the curved road, perform assistance control which is one or both of deceleration control for decelerating the vehicle so that a speed of the vehicle approaches a target speed based on the curved road information and notification control for notifying that the speed of the vehicle approaches the target speed and stop the assistance control when a driver has performed an operation of stopping the assistance control during the assistance control; and control an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

(2): In the above-described aspect (1), the processor executes the computer-readable instructions to: start the assistance control for the second curved road when an operation of stopping the assistance control has been performed in an overlap segment in which the first target segment and the second target segment overlap when the overlap segment is present.

(3): In the above-described aspect (1), the processor executes the computer-readable instructions to: start the assistance control for the first curved road when the vehicle has entered the first target segment not overlapping the second target segment; continue the assistance control for the first curved road when the vehicle has entered the overlap segment; and stop the assistance control for the first curved road and start the assistance control for the second curved road when an operation of stopping the assistance control has been performed in the overlap segment.

(4): In the above-described aspect (3), the overlap segment is a segment set on the first curved road.

(5): In any one of the above-described aspects (1) to (4), the processor executes the computer-readable instructions to: stop the assistance control when an operation of stopping the assistance control being executed in the first target segment not overlapping the second target segment has been performed and start the assistance control for the second curved road when the vehicle has entered the second target segment.

(6): In any one of the above-described aspects (1) to (4), the processor executes the computer-readable instructions to: when an operation of stopping the assistance control has been performed in an overlap segment in which the first target segment and the second target segment overlap, start the assistance control for the second curved road after the elapse of a predetermined time from the time when the operation has been performed or the time when the assistance control has been stopped or after the vehicle travels a predetermined distance.

(7): In any one of the above-described aspects (1) to (4), an operation of stopping the assistance control is an acceleration operation of the driver on an operation element, and the processor executes the computer-readable instructions to: accelerate the vehicle at a first acceleration degree in a case where the driver has performed the acceleration operation of a first operation degree on the operation element when the assistance control is not being performed; accelerate the vehicle at a second acceleration degree less than the first acceleration degree in a case where the driver has performed the acceleration operation of the first operation degree on the operation element after an operation of stopping the assistance control during the assistance control is performed and the assistance control is stopped when the vehicle is scheduled to travel on a third curved road where another curved road is not located within a predetermined distance; and accelerate the vehicle at a third acceleration degree less than the second acceleration degree or prevent the vehicle from accelerating in a case where the driver has performed the acceleration operation of the first operation degree on the operation element after an operation of stopping the assistance control during the assistance control is performed and the assistance control is stopped when the vehicle is scheduled to travel on the first curved road and the second curved road located within a predetermined distance from the first curved road.

(8): According to another aspect of the present invention, there is provided a vehicle control method to be executed by a computer, the vehicle control method including: a process of acquiring, curved road information about a curved road located in a travel direction of a vehicle; while the vehicle is traveling in a segment from an entrance to the curved road to a position a predetermined distance before the entrance or while the vehicle is traveling on the curved road, a process of performing assistance control which is one or both of deceleration control for decelerating the vehicle so that a speed of the vehicle approaches a target speed based on the curved road information and notification control for notifying that the speed of the vehicle approaches the target speed and stopping the assistance control when a driver has performed an operation of stopping the assistance control during the assistance control; and a process of controlling an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

(9): According to yet another aspect of the present invention, there is provided a non-transitory computer storage medium storing a program for causing a computer to execute: a process of acquiring, curved road information about a curved road located in a travel direction of a vehicle; while the vehicle is traveling in a segment from an entrance to the curved road to a position a predetermined distance before the entrance or while the vehicle is traveling on the curved road, a process of performing assistance control which is one or both of deceleration control for decelerating the vehicle so that a speed of the vehicle approaches a target speed based on the curved road information and notification control for notifying that the speed of the vehicle approaches the target speed and stopping the assistance control when a driver has performed an operation of stopping the assistance control during the assistance control; and a process of controlling an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

According to the aspects (1) to (9), in the vehicle control device, the vehicle control method, and the storage medium, it is possible to appropriately control the behavior of the vehicle according to the driver's operation when the vehicle is scheduled to travel on the first curved road and the second curved road.

According to the aspect (2) or (3), the vehicle control device can appropriately stop the assistance control for the first curved road and start the assistance control for the second curved road.

According to the aspect (6), when the operation of stopping the assistance control has been performed in the overlap segment, the vehicle control device starts the assistance control for the second curved road after the elapse of a predetermined time from the time when the operation has been performed or the time when the assistance control has been stopped or after the vehicle travels the predetermined distance, thereby enabling the driver to recognize that the assistance control for the first curved road has been stopped and the assistance control for the second curved road has been started.

According to the aspect (7), if the vehicle travels on the first curved road and the second curved road, the vehicle control device suppresses acceleration or prevents acceleration when the acceleration operation has been performed during the assistance control, thereby controlling the speed of the vehicle to a speed appropriate for a continuously curved road.

DETAILED DESCRIPTION OF THE INVENTION

Hereinafter, embodiments of a vehicle control device, a vehicle control method, and a storage medium of the present invention will be described with reference to the drawings.

Embodiments

[Overall Configuration]

Figure 1:
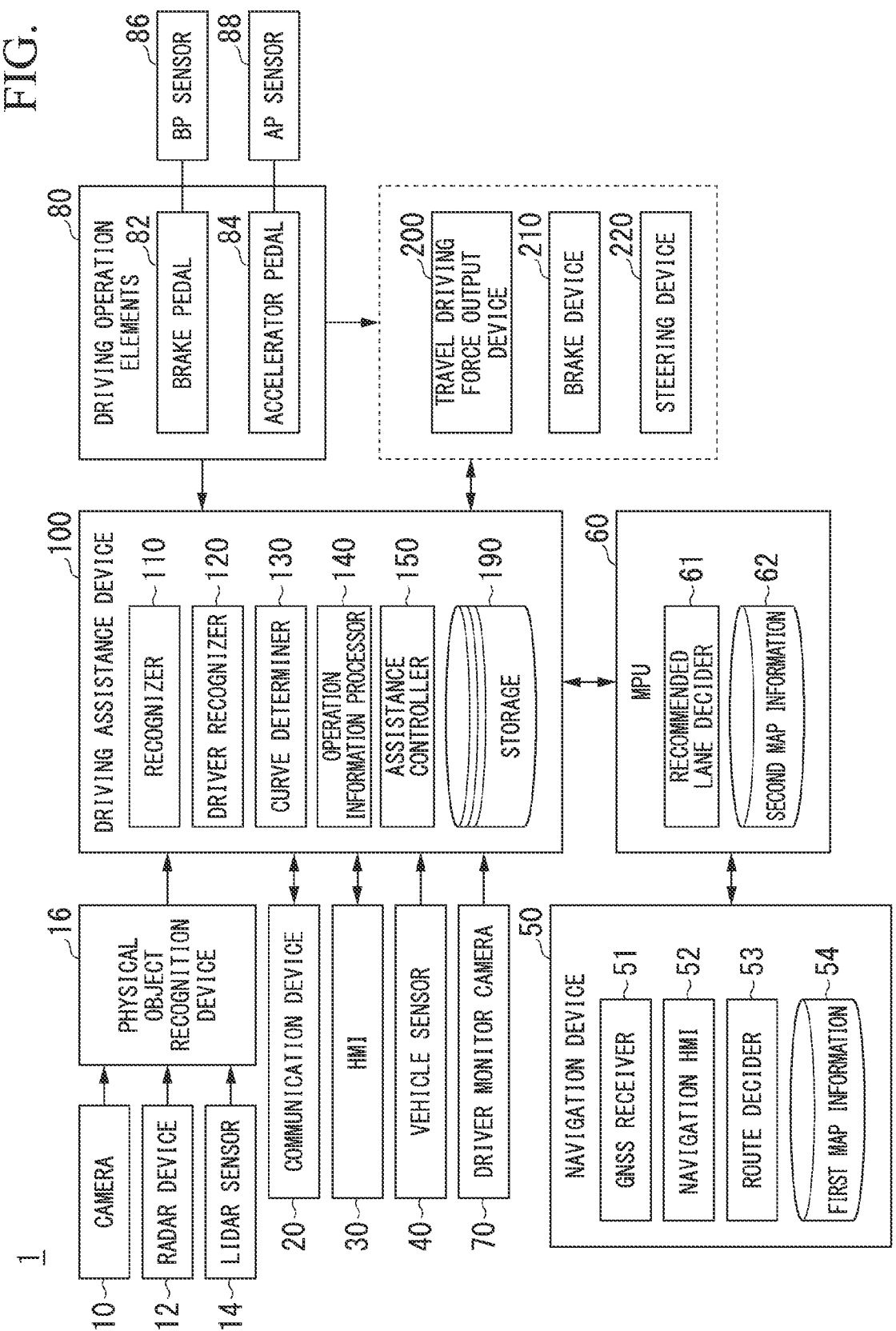
FIG. 1 is a configuration diagram of a vehicle system using a vehicle control system according to an embodiment.

FIG. 1 is a configuration diagram of a vehicle system 1 using a vehicle control system according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, a driving operation element 80, a driving assistance device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The driving assistance device 100 is an example of a "vehicle control device."

For example, the camera 10 is a digital camera using a solid-state imaging element such as a charge-coupled device (CCD) or a complementary metal oxide semiconductor (CMOS). The camera 10 is attached to any location on the vehicle (hereinafter referred to as a vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and a speed of the physical object in a frequency-modulated continuous wave (FM-CW) scheme.

The LIDAR sensor 14 radiates light to the vicinity of the vehicle M (or electromagnetic waves having a wavelength close to that of light) and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are. The physical object recognition device 16 may be omitted from the vehicle system 1.

The communication device 20 communicates with another vehicle located in the vicinity of the vehicle M, using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the vehicle M and receives an input operation by the occupant. The HMI 30 includes various types of display devices, a speaker, a buzzer, a touch panel, a switch, keys, and the like. The HMI 30 includes a display device. The display device (display) is, for example, a display device, i.e., a multi-information display, for displaying various information in the vehicle M such as a speedometer indicating a traveling speed of the vehicle M or a tachometer indicating a rotational speed of the internal combustion engine provided in the vehicle M provided in the center of the instrument panel of the vehicle M.

The vehicle sensor 40 includes a vehicle speed sensor configured to detect the speed of the vehicle M, an acceleration sensor configured to detect acceleration, a yaw rate sensor configured to detect angular velocity around a vertical axis, a direction sensor configured to detect a direction of the vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or complemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a travel direction of the vehicle), and decides on a recommended lane for each block with reference to the second map information 62. The recommended lane decider 61 decides in what lane numbered from the left the vehicle will travel. The recommended lane decider 61 decides on the recommended lane so that the vehicle M can travel along a reasonable route for traveling to a branching destination when there is a branch point on the route on the map.

The second map information 62 is map information with higher accuracy than the first map information 54. The second map information 62 includes, for example, information about a center of a lane, information about a boundary of the lane, or the like. The second map information 62 may include road information, traffic regulation information, address information (address/postal code), facility information, telephone number information, and the like. The second map information 62 may be updated at any time by the communication device 20 communicating with other devices. The second map information 62 includes information such as a position of a curved road, the curvature of the curved road, a curve radius of the curved road, and a gradient of the curved road. This information may be included in the first map information 54. The second map information 62 or the first map information 54 may include information indicating whether or not it is a curved road where a first target segment and a second target segment overlap to be described below.

The driver monitor camera 70 is, for example, a digital camera that uses a solid-state image sensor such as a CCD or a CMOS. The driver monitor camera 70 is attached to any location on the vehicle M with respect to a position and a direction where the head of the occupant (hereinafter, the driver) sitting in the driver's seat of the vehicle M can be imaged from the front (in a direction in which his/her face is imaged). For example, the driver monitor camera 70 is attached to an upper part of a display device provided on the central portion of the instrument panel of the vehicle M. The driver monitor camera 70 outputs an image obtained by imaging the cabin including the driver of the vehicle M from an arrangement position to the driving assistance device 100.

The driving operation elements 80 include, for example, a brake pedal 82, an accelerator pedal 84, a steering wheel, a direction indicator operation switch, a shift lever, and other operation elements. A sensor that detects an amount of operation or the presence or absence of operation is attached to the driving operation element 80, and the detection result is output to the driving assistance device 100 or some or all of the travel driving force output device 200, the brake device 210, and the steering device 220. The steering wheel does not necessarily have to be annular and may be in the form of a variant steering wheel, a joystick, a button, or the like. A brake pedal sensor (BP sensor) 86 is attached to the brake pedal 82. An accelerator pedal sensor (AP sensor) 88 is attached to the accelerator pedal 84.

The BP sensor 86 detects an operation amount corresponding to an operation on the brake pedal 82. The AP pedal sensor 88 detects an opening degree of the accelerator pedal that changes with the driver's operation on the accelerator pedal 84.

The driving assistance device 100 includes, for example, a recognizer 110, a driver recognizer 120, a curve determiner 130, an operation information processor 140, an assistance controller 150, and a storage 190. Some or all of these functional elements are implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the driving assistance device 100 or may be stored in a removable storage medium such as a DVD or a CD-ROM and installed in an HDD or a flash memory of the driving assistance device 100 when the storage medium (the non-transitory storage medium) is mounted in a drive device. The curve determiner 130 is an example of an acquirer and the assistance controller 150 is an example of a controller.

The storage 190 is implemented by an HDD, a flash memory, an electrically erasable programmable read-only memory (EEPROM), a read-only memory (ROM), a random-access memory (RAM), or the like.

On the basis of information input from the camera 10, the radar device 12, and the LIDAR sensor 14 via the physical object recognition device 16, the recognizer 110 recognizes a state of a position, velocity, acceleration, and the like of a physical object in the vicinity of the vehicle M. The position of the physical object, for example, is recognized as a position of an absolute coordinate system having a representative point of the vehicle M (a center of gravity, a drive shaft center, or the like) as the origin, and is used for control. The position of the physical object may be represented by a representative point such as the center of gravity or a corner of the physical object or may be represented in a region. The "state" of the physical object may include the acceleration or jerk of the physical object, or the "action state" (for example, whether or not the lane is changing or is about to change).

Also, for example, the recognizer 110 recognizes a lane in which the vehicle M is traveling (a travel lane). For example, the recognizer 110 recognizes the travel lane by comparing a pattern of road markings (for example, an arrangement of solid lines and broken lines) obtained from the second map information 62 with a pattern of road markings in the vicinity of the vehicle M recognized from an image captured by the camera 10. The recognizer 110 may recognize a travel lane by recognizing a runway boundary (road boundary) including a road marking, a shoulder, a curb, a median strip, a guardrail, and the like as well as a road marking. In this recognition, a position of the vehicle M acquired from the navigation device 50 or a processing result of the INS may be taken into account. The recognizer 110 recognizes a temporary stop line, an obstacle, red traffic light, a toll gate, and other road events.

When the travel lane is recognized, the recognizer 110 recognizes a position or an orientation of the vehicle M with respect to the travel lane. For example, the recognizer 110 may recognize a gap of a reference point of the vehicle M from the center of the lane and an angle formed between the travel direction of the vehicle M and a line connected to the center of the lane as a relative position and orientation of the vehicle M related to the travel lane. Alternatively, the recognizer 110 may recognize a position of the reference point of the vehicle M related to one side end portion (a road marking or a road boundary) of the travel lane or the like as a relative position of the vehicle M related to the travel lane.

The driver recognizer 120 detects whether or not the driver is in a predetermined state on the basis of the image captured by the driver monitor camera 70. The predetermined state is a state in which hands-off lane keeping control to be described below can be executed. Hands-off is a state in which the driver is not gripping the steering wheel and hands-on is a state in which the driver is gripping the steering wheel. The state in which hands-off lane keeping control can be executed is a state in which the driver is monitoring the front (or the vicinity of the vehicle M). Forward monitoring indicates, for example, that the driver monitors the front so that the driver can quickly makes a change from a state in which the vehicle system 1 controls the vehicle M to a state in which the driver operates the vehicle M. Forward monitoring indicates, for example, that the driver's visual line is facing forward. Whether or not the driver is in a hands-on state or a hands-off state is determined on the basis of a detection result of a grip sensor that detects the gripping state of the steering wheel (not shown).

The curve determiner 130 acquires curved road information about a curved road located in a travel direction of the vehicle M. The curved road information is, for example, information about a position of the curved road, a shape of the curved road (for example, including curvature, a radius, and a gradient), and the like. The curve determiner 130 identifies a position of the curved road for the vehicle M on the basis of, for example, a position of the vehicle M and the curved road information obtained from the second map information 62. The curve determiner 130 determines whether or not the curved road is a compound curve. The curve determiner 130 may determine the position, shape, compound curve, or the like of the curved road on the basis of a recognition result of the recognizer 110 instead of (or in addition to) the above. The compound curve is a curved road in which a first curved road and a second curved road are located within a predetermined distance. Details will be described below.

The operation information processor 140 acquires operation information about an acceleration operation of the driver of the vehicle M. The operation information is, for example, information indicating an accelerator pedal opening degree output from the AP pedal sensor 88. The operation information processor 140 acquires operation information about a deceleration operation of the driver of the vehicle M. For example, operation information processor 140 acquires information indicating an operation amount on the brake pedal output from the BP sensor 86. The operation information processor 140, for example, acquires the driver's operation state for equipment mounted in the vehicle M. For example, when the driver performs an operation of flashing a direction indicator (not shown), the operation information processor 140 acquires information indicating that this operation has been performed.

The assistance controller 150 assists the driver in controlling the vehicle M. For example, the assistance controller 150 automatically controls the travel driving force output device 200 and the brake device 210 without depending on the driver's operation, and automatically controls the speed of the vehicle M. The assistance controller 150 executes so-called adaptive cruise control (ACC).

For example, when there is no other vehicle within a predetermined distance from the vehicle M in front of the vehicle M, the assistance controller 150 automatically controls the travel driving force output device 200 and the brake device 210 without depending on the driver's operation so that the vehicle M travels at a speed set by the driver, a legal speed, and a speed preset in accordance with a road.

For example, when there is another vehicle in front of the vehicle M and within a predetermined distance from the vehicle M, the assistance controller 150 automatically controls the travel driving force output device 200 and the brake device 210 without depending on the driver's operation to track the other vehicle. Tracking indicates that the vehicle M is behind the other vehicle and travels while maintaining a position of a predetermined distance from the other vehicle.

The assistance controller 150 controls the steering device 220 so that the vehicle M does not deviate from the travel lane. For example, the assistance controller 150 controls the steering device 220 so that the vehicle M travels in the center of the travel lane recognized by the recognizer 110 or near the center. For example, the assistance controller 150 executes hands-off lane keeping control for controlling the steering of the vehicle M in a state in which the driver is not gripping the steering wheel or hands-on lane keeping control for controlling the steering of the vehicle M in a state in which the driver is gripping the steering wheel.

The assistance controller 150 automatically changes lanes of the vehicle M. For example, the assistance controller 150 generates a trajectory for changing lanes and causes the vehicle M to change lanes so that the vehicle M travels along the generated trajectory. The assistance controller 150 causes the vehicle M to change lanes (auto lane change (ALC)) on the basis of a destination set by an occupant and a recommended lane output to the MPU 60.

The assistance controller 150 may automatically change lanes of the vehicle M when the driver instructs the driver to change lanes. The lane change instruction is an operation on a lever part of an operation switch of the direction indicator. For example, when the driver operates the lever part in a direction in which the vehicle M wants to change lanes, the vehicle M changes lanes in the direction corresponding to the operation. The lane change instruction may be an operation different from the operation of the lever part of the operation switch of the direction indicator. For example, when a predetermined operation button is pressed, a lane change may be performed. A part or all of a control process of the assistance controller 150 may be omitted.

Further, the assistance controller 150 assists the driver so that the vehicle M can travel smoothly on the curved road by decelerating the vehicle M to a speed corresponding to the curved road or providing a notification related to deceleration to the driver when the vehicle M enters the curved road or while the vehicle M is traveling on the curved road. Hereinafter, this control may be referred to as assistance control.

The travel driving force output device 200 outputs a travel driving force (torque) for enabling the traveling of the vehicle M to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the assistance controller 150 or information input from the accelerator pedal of the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the assistance controller 150 or the information input from the driving operation element 80 so that brake torque according to a braking operation is output to each wheel.

For example, the steering device 220 includes a steering ECU and an electric motor. For example, the electric motor changes a direction of steerable wheels by applying a force to a rack and pinion mechanism. The steering ECU drives the electric motor in accordance with the information input from the assistance controller 150 or the information input from the driving operation element 80 to change the direction of the steerable wheels.

[Assistance Control]

While the vehicle M is traveling in a segment from an entrance to the curved road to a position of a predetermined distance before the entrance or while the vehicle M is traveling on the curved road, the assistance controller 150 performs assistance control that is one or both of deceleration control for decelerating the vehicle M so that a speed of the vehicle M approaches a target speed based on the curved road information and notification control for notifying that the speed of the vehicle M approaches the target speed. The assistance controller 150 stops assistance control when an operation of stopping the assistance control has been performed during the assistance control. The assistance control is, for example, a process to be executed when the driving assistance device 100 does not automatically control the speed of the vehicle M (for example, ACC is not activated) and the driver controls the speed of the vehicle M. The target speed is a speed determined according to a shape of the curved road, a legal speed of the curved road, or the like.

A target of assistance control may be a curved road that satisfies a condition. The condition is, for example, that a curve radius is within a predetermined range. The predetermined range is a curve radius at which deceleration is required when the vehicle M is traveling.

The assistance control may be performed on the condition that the speed of the vehicle M is less than or equal to a predetermined speed. The predetermined speed is a speed that does not deviate from the speed limit or recommended speed of the curved road or the road before or after the curved road by a predetermined speed or more. The predetermined speed is, for example, a speed obtained by adding a set speed (for example, 30 km/h) to the above speed limit or recommended speed.

The assistance control may be performed when the condition of the road surface satisfies a criterion. Satisfying the criterion indicates that, for example, there is no event that affects the braking operation, such as the road surface not being frozen. For example, the recognizer 110 may recognize a road surface situation on the basis of a detection result of the physical object recognition device 16 or the driving assistance device 100 may recognize a road surface situation on the basis of information provided by the other device. The assistance control may be performed when a gradient of the curved road is less than a threshold value.

Figure 2:
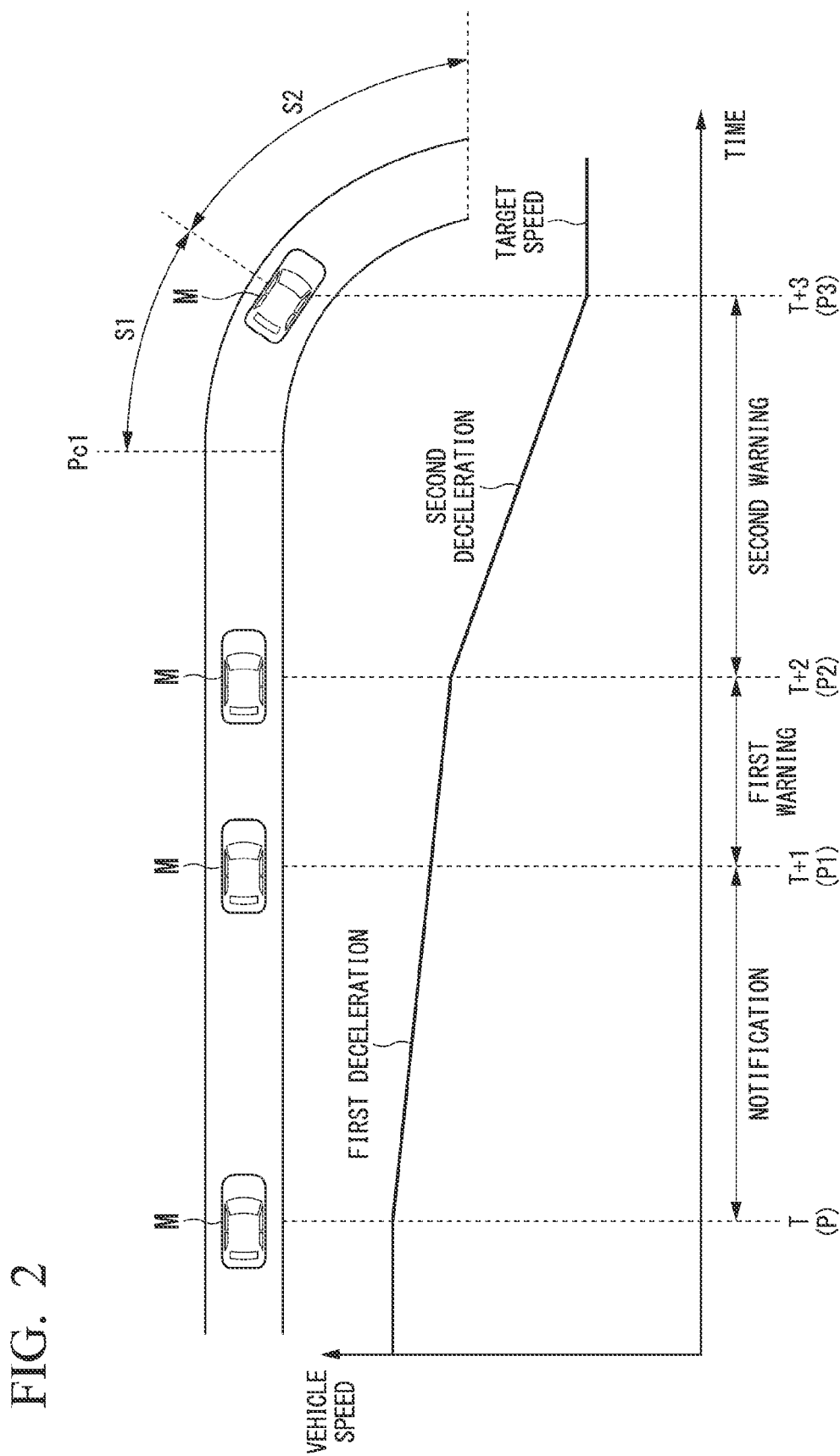
FIG. 2 is a diagram for describing assistance control.

FIG. 2 is a diagram for describing assistance control. The assistance controller 150 decelerates the vehicle M at a first deceleration degree when the vehicle M has reached the start point of the above segment and decelerates the vehicle M at a second deceleration degree greater than the first deceleration degree when the vehicle M approaches an entrance to the curved road. After decelerating the vehicle M at the first deceleration degree and before decelerating the vehicle M at the second deceleration degree, the assistance controller 150 initiates a notification (for example, a first warning) indicating that the curved road is approaching to the driver of the vehicle M. Hereinafter, this will be specifically described with reference to FIG. 2.

Time T is a timing when the vehicle M reaches a position P the predetermined distance before the entrance to the curved road. The position the predetermined distance before is a preset position according to the target speed. For example, the position the predetermined distance before is set as a position farther from the entrance to the curved road when the deviation between the speed of the vehicle M and the target speed is larger. The position the predetermined distance before is set as a position where the time when a preset notification is performed, the time when a preset first warning is performed, and the time when a preset second warning is performed can be secured when a brake override or an accelerator override is not performed as described below.

After passing the position P, the vehicle M passes positions P1, P2, and P3 in that order. The time at which the vehicle M reaches the position P is time T, the time at which the vehicle M reaches the position P1 is time T+1, the time at which the vehicle M reaches the position P2 is time T+2, and the time at which the vehicle M reaches the position P3 is time T+3. The entrance to the curved road is provided between the position P2 and the position P3. The entrance to the curved road is, for example, a position (Pc1) where the road (lane) begins to bend or a position where the road has a curvature of a threshold value or more.

The position P3 corresponding to the above time T+3 may be a preset position for each curved road or may be a position obtained by the curve determiner 130 on the basis of the curvature of the curved road. The position P3 is set at or near an end of a trend in which curvature increases in the curved road. For example, there is a trend in which curvature increases in a segment Si from the position Pc1 to the position P3 and the curvature becomes uniform in the segment passing the position P3. As described above, the position P3 is set on the basis of a change in curvature. Alternatively, instead of a point where a trend in which curvature increases ends, the position P3 may be set at a distance of several meters before or after this point or the like.

At time T, when the speed of the vehicle M is greater than the target speed, the assistance controller 150 provides a notification to the driver and decelerates the vehicle M at a first deceleration degree. The notification is a notification that makes the driver aware of the curved road. Examples of the notification include a notification that the vehicle M has approached a curved road in a state in which the speed of the vehicle M is greater than the target speed or a notification for starting assistance control for decelerating the vehicle M so that the speed of the vehicle M approaches the target speed. The notification is performed, for example, via the HMI 30. The notification may be an image notification, or a voice or vibration notification (for example, vibrating a seat belt). In the assistance control, the assistance controller 150 may display information indicating the shape of the curved road and the direction in which the vehicle M is traveling on the HMI.

At time T+1, the assistance controller 150 performs a first warning for the driver. The first warning is a warning that makes the driver aware of the curved road. The first warning is, for example, a warning for the driver, and is a warning to decelerate the vehicle M so that the speed of the vehicle M approaches the target speed.

The assistance controller 150 performs a second warning for the driver at time T+2, decelerates the vehicle M at a second deceleration degree, and causes the speed of the vehicle M to match the target speed at time T+3. The second deceleration degree is a deceleration degree greater than the first deceleration degree. The second warning is a warning that makes the driver aware of the curved road. The second warning is a warning for the driver, and is a warning to decelerate the vehicle M so that the speed of the vehicle M approaches the target speed. The second warning is a warning stronger than the first warning. The stronger warning is a warning that makes the driver feel the need to decelerate more. For example, for the stronger warning, the assistance controller 150 provides an image that prompts the driver to decelerate, outputs a louder sound, or gives a larger vibration to the driver.

As described above, the assistance controller 150 provides assistance for the vehicle M to travel on a curved road. Thereby, it is possible to assist the driver in operating so that the vehicle M travels smoothly on the curved road at the target speed.

[Override of Deceleration Operation]

When the driver operates the brake pedal 82 to a predetermined operation degree or more while the assistance control is being performed, the assistance controller 150 causes the vehicle M to decelerate by stopping the assistance control and controlling the brake device 210 in accordance with the driver's operation. Hereinafter, this control may be referred to as a brake override.

Figure 3:
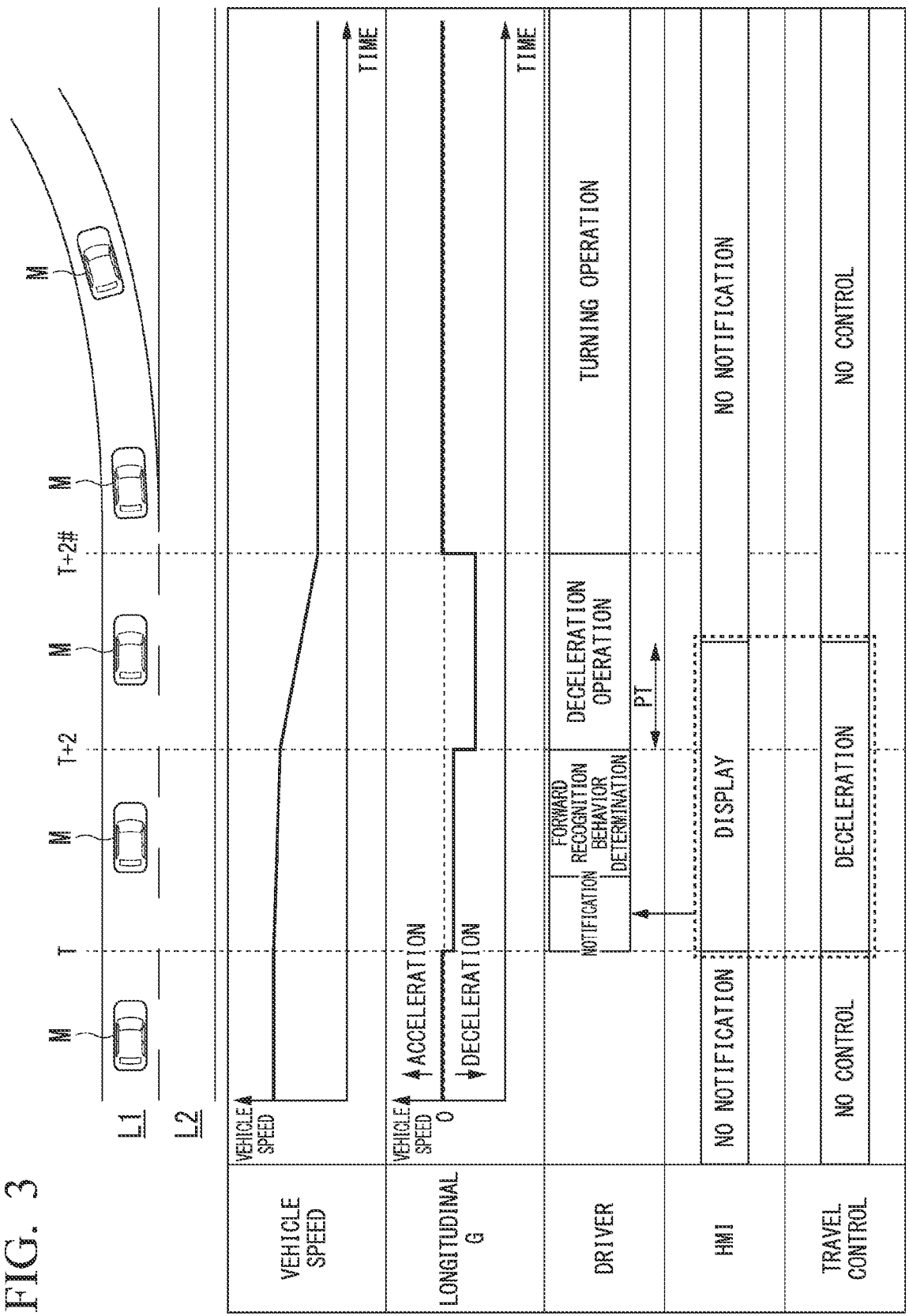
FIG. 3 is a diagram for describing a brake override.

FIG. 3 is a diagram for describing the brake override. The vehicle M is traveling in a first lane L1 connected to the curved road. The first lane L1 is a lane adjacent to the second lane L2 not connected to the curved road. Between time T and time T+2, the assistance controller 150 decelerates the vehicle M at a first deceleration degree and provides a notification or a first warning via the HMI 30. The driver detects a change in gravity (longitudinal G) in the travel direction of the vehicle M as the vehicle M decelerates and further recognizes that the vehicle M is approaching a curved road according to the notification or the first warning via the HMI. When the driver operates the brake pedal 82 at a predetermined operation degree or more for a predetermined time PT (for example, 2 sec, 3 sec, or the like) according to the above-described recognition, the assistance control stops at time T+2 #. When the brake pedal 82 is operated as described above, the assistance controller 150 considers that the driver recognizes the curved road and is trying to decelerate the vehicle M to a speed corresponding to the curved road, and stops the assistance control. Thereby, the notification or warning is stopped and a deceleration control process of the assistance controller 150 is further stopped.

For example, even if the curved road is not recognized, the driver may reflexively operate the brake pedal 82 according to a notification or warning. In this case, it is not appropriate to perform a brake override. In the present embodiment, as described above, when the driver operates the brake pedal 82 at the predetermined operation degree or more and for the predetermined time PT, the assistance control is stopped, such that it is possible to cause the brake override to be established after the driver is allowed to recognize the curved road. Thus, the assistance controller 150 can stop the assistance control at an appropriate timing.

[Override of Acceleration Operation]

The assistance controller 150 accelerates the vehicle M at first acceleration in a case where information indicating that the driver has performed an acceleration operation has been acquired when the assistance control is not operating and accelerates the vehicle M at second acceleration that is suppressed as compared with the first acceleration in a case where information indicating that the driver has performed the above-described acceleration operation has been acquired when the assistance control is being performed. Thus, an accelerator override is performed.

Figure 4:
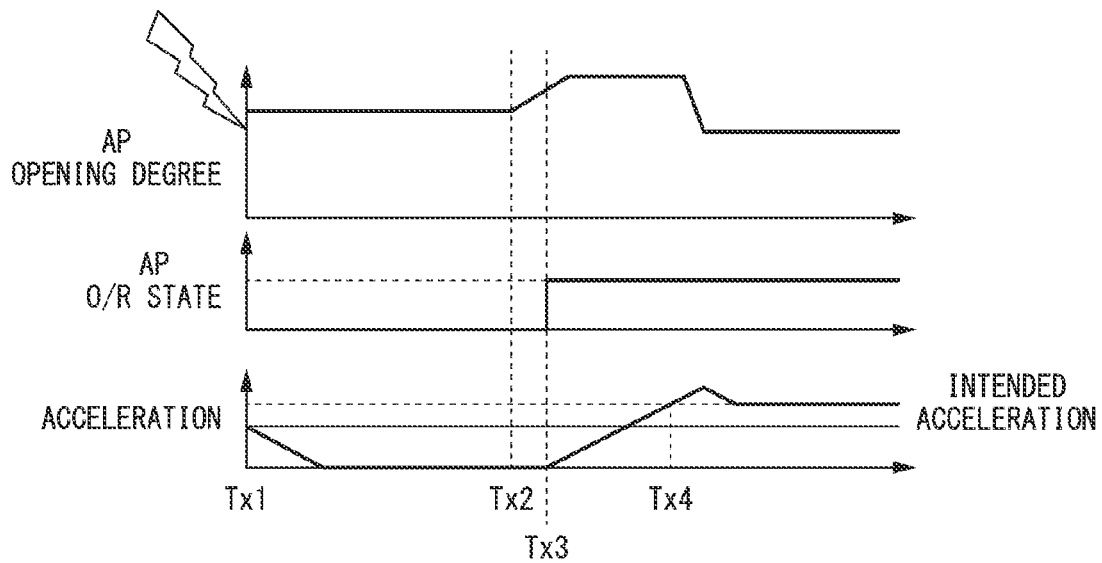
FIG. 4 is a diagram for describing an override of an acceleration operation.

FIG. 4 is a diagram for describing the override of the acceleration operation. At time Tx1, the assistance controller 150 starts the assistance control and starts decelerating the vehicle M. At time Tx2, the driver starts operating the accelerator pedal 84 to accelerate the vehicle M. At time Tx3, when the operation of the accelerator pedal 84 satisfies the condition of the accelerator override (AP O/R state), the assistance controller 150 accelerates the vehicle M at the second acceleration until the acceleration of the vehicle M reaches predetermined acceleration. In the example of FIG. 4, in a period from time Tx3 to time Tx4, the assistance controller 150 accelerates the vehicle M at the second acceleration. The condition for the accelerator override may be that a condition to be described below is satisfied or that the accelerator pedal opening degree reaches a threshold value.

The predetermined acceleration is, for example, acceleration corresponding to the accelerator pedal opening degree when the acceleration is not suppressed as described above. In other words, it is the original acceleration of the vehicle M corresponding to the accelerator pedal opening degree (an amount of operation on the accelerator pedal). As the operation amount of the driver's accelerator pedal increases, the predetermined acceleration increases. As the operation amount of the driver's accelerator pedal decreases, the predetermined acceleration decreases. Thus, the assistance controller 150 accelerates the vehicle M until it reaches acceleration corresponding to the amount of operation on the accelerator pedal.

Figure 5:
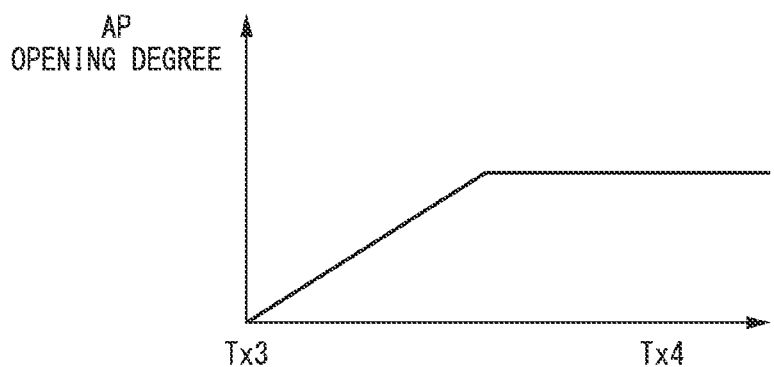
FIG. 5 is a diagram for describing an accelerator pedal opening degree based on an operation of a driver.

The first acceleration and the second acceleration will be described with reference to FIGS. 5 and 6. FIG. 5 is a diagram for describing an accelerator pedal opening degree based on an operation of the driver. The vertical axis represents an accelerator pedal opening degree and the horizontal axis represents time. For example, in the case where it is assumed that assistance control has been executed (in the case of pattern 1) and in the case where it is assumed that assistance control has not been executed (in the case of pattern 2), it is assumed that the driver operates the accelerator pedal (to perform the acceleration operation of the first operation degree) and the accelerator pedal opening degree changes as shown in FIG. 5. The change in the accelerator pedal opening degree from time Tx3 to time Tx4 is shown. In this case, the acceleration changes as shown in FIG. 6.

Figure 6:
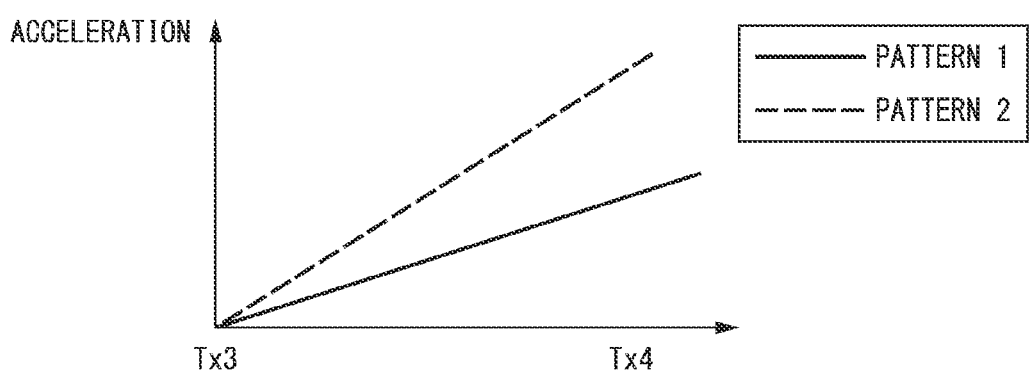
FIG. 6 is a diagram for describing acceleration changes in pattern 1 and pattern 2.

FIG. 6 is a diagram for describing changes in accelerations of pattern 1 and pattern 2. The vertical axis represents acceleration and the horizontal axis represents time. The acceleration of pattern 1 (second acceleration) is suppressed as compared with the acceleration of pattern 2 (first acceleration). Even if the accelerator pedal opening degree changes similarly in pattern 1 and pattern 2, the increase in acceleration in pattern 1 is suppressed as compared with pattern 2 and a control process is performed so that the speed of the vehicle M reaches the predetermined acceleration over time as compared with the case of pattern 2.

The acceleration of the above-described pattern 1 is, for example, acceleration at which the driver can suppress an acceleration process within a predetermined time even if the acceleration process unintended by the driver is performed. For example, when the unintentional acceleration process has been performed, the movement time until the driver removes the foot on the accelerator pedal from the accelerator pedal and moves the foot to the brake pedal 82 is considered. The acceleration of pattern 1, for example, is set to acceleration at which an acceleration process can be suppressed within a predetermined time (the vehicle M can be decelerated) when the brake operation is performed after the movement time as described above or less.

The acceleration of pattern 1 described above may be acceleration that is suppressed as compared with acceleration of a case where an override is established when ACC is executed. For example, in a case where the operation on the accelerator pedal 84 satisfies the condition when ACC is executed, the assistance controller 150 stops the ACC and accelerates the vehicle M according to the driver's operation on the accelerator pedal 84. The acceleration at this time may be acceleration greater than the acceleration (second acceleration) of pattern 1.

The assistance controller 150 may adjust the acceleration of pattern 1 in accordance with the operation mode of the driver's accelerator pedal during a set period. The assistance controller 150 adjusts the acceleration of pattern 1 in accordance with the operation amount or operation speed of the driver's accelerator pedal during the set period. The set period is one of a period before the accelerator override is established, a period in which the accelerator override is established, and a period after the accelerator override is established, a combination of these periods, and a predetermined period including these periods.

For example, an adjustment is made so that the acceleration of pattern 1 is close to the acceleration of pattern 2 as the operation speed increases. For example, an adjustment is made so that the acceleration of pattern 1 is close to the acceleration of pattern 2 as the operation amount increases. The assistance controller 150 adjusts the acceleration by adding a gain corresponding to the operation speed or the operation amount to the acceleration of pattern 1. Thereby, the assistance controller 150 can implement a process of controlling the vehicle M to reflect the driver's intention.

The assistance controller 150, for example, causes the acceleration of the vehicle M to reach the target acceleration at a first time by accelerating the vehicle M at the first acceleration in a case where the second information indicating that a first acceleration operation has been performed to cause the speed of the vehicle M to approach the target speed has been acquired when the assistance control is not operating. The assistance controller 150 causes the acceleration of the vehicle M to reach the target acceleration at a second time after the first time by accelerating the vehicle M at the second acceleration that is suppressed as compared with the first acceleration in a case where the second information indicating that the first acceleration operation has been performed has been acquired when the assistance control is being performed. Thus, even if an accelerator override is performed, the assistance controller 150 further suppresses the acceleration and controls the acceleration of the vehicle M so that the acceleration of the vehicle M approaches the acceleration intended by the driver (across a long period of time) smoothly. Thereby, the assistance controller 150 can suppress the acceleration of the vehicle M from deviating from the target acceleration and can more reliably make the acceleration of the vehicle M close to the acceleration intended by the driver.

Comparative Example

Figure 7:
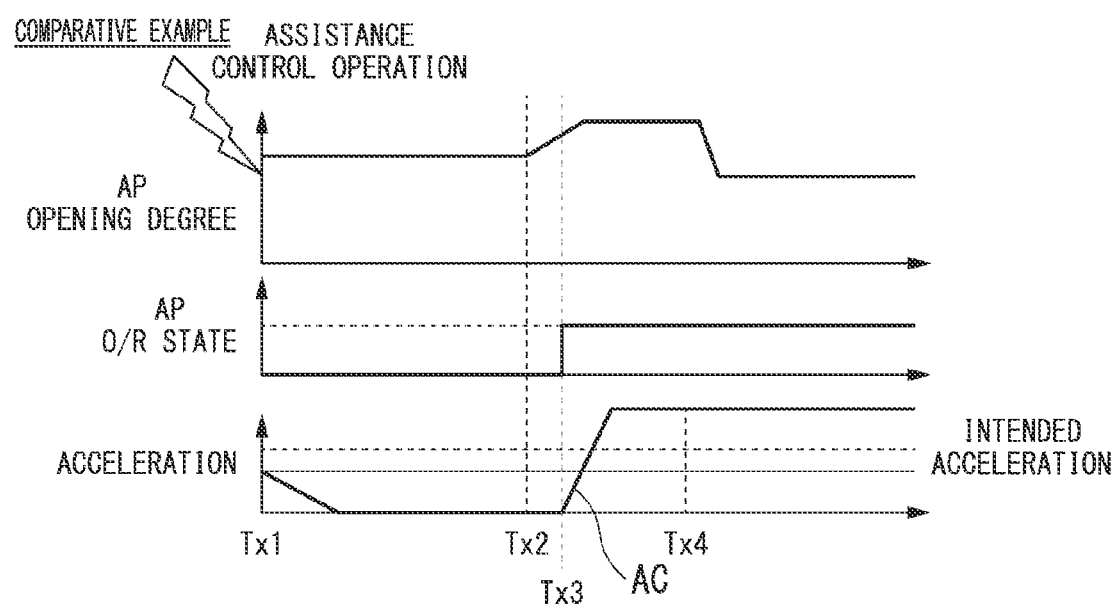
FIG. 7 is a diagram for describing a change in acceleration when acceleration is not suppressed.

FIG. 7 is a diagram for describing a change in acceleration when acceleration is not suppressed. As shown in FIG. 7, when the acceleration is not suppressed, the vehicle M may accelerate at acceleration greater than the acceleration intended by the driver. While assistance control continues between time Tx2 and time Tx3, the driver may depress the accelerator pedal more strongly because the driver is depressing the accelerator pedal but acceleration is suppressed according to the assistance control. As a result, the accelerator pedal override is established, and the vehicle M may accelerate at acceleration exceeding the acceleration intended by the driver (AC in FIG. 7).

On the other hand, in the present embodiment, as described in FIGS. 4 to 6, the assistance controller 150 can accelerate the vehicle M at the acceleration intended by the driver because the acceleration is suppressed in the accelerator override of the assistance control. As a result, the assistance controller 150 can implement a process of controlling the vehicle M corresponding to the driver's intention.

[Condition of Accelerator Override]

The assistance controller 150 stops the assistance control and accelerates the vehicle M when operation information indicating one or both of an amount of operation of the driver on the accelerator pedal and a speed of operation on the accelerator pedal satisfies a condition during the assistance control. The condition is, for example, any of (1) to (3).

(1) The operation amount during a predetermined period reaches a first threshold value.

(2) The accelerator pedal is operated at the operation speed greater than or equal to a second threshold value and the operation amount reaches a third threshold value. For example, (2) is valid when the driver kicks down the accelerator pedal. The third threshold value is, for example, a threshold value greater than the first threshold value.

(3) An operation of the operation amount greater than or equal to a fourth threshold value is performed a plurality of times. The fourth threshold value is, for example, a threshold value greater than the first threshold value.

The above-described (1) may be determined on the basis of the cumulative value of the amount of operation on the accelerator pedal. The assistance controller 150 establishes an accelerator override when a cumulative change amount (operation amount) of the accelerator pedal opening degree in a predetermined period has reached a threshold value. The cumulative change amount is, for example, the change amount (operation amount) of the accelerator pedal opening degree corresponding to the fact that the accelerator pedal 84 is operated to accelerate the vehicle M. The cumulative change amount is, for example, a cumulative value of an amount of depression on the accelerator pedal 84 depressed by the driver. As described above, the assistance controller 150 establishes an accelerator override when the accelerator pedal 84 is operated with an operation amount greater than or equal to a predetermined degree and the cumulative depression amount has reached a threshold value within the predetermined period.

As described above, the assistance controller 150 can stabilize the vehicle M by suppressing acceleration and control the vehicle M for the driver's intended acceleration.

[Flowchart Related to Assistance Control]

Figure 8:
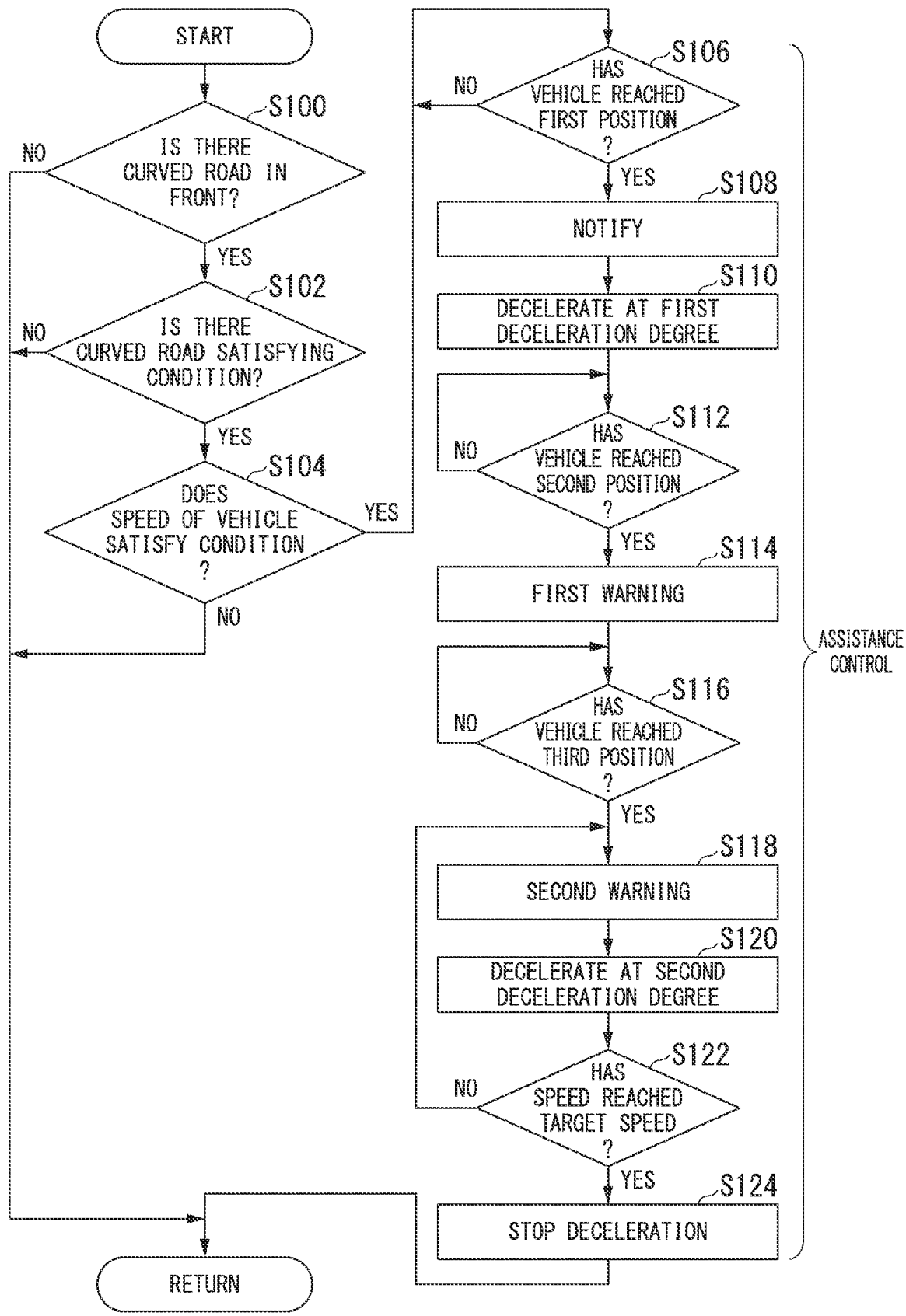
FIG. 8 is a flowchart showing an example of a flow of a process executed by a driving assistance device.

FIG. 8 is a flowchart showing an example of a flow of a process executed by the driving assistance device 100. The order of processing in the present flowchart may be changed or some processing may be omitted.

First, the driving assistance device 100 determines whether or not there is a curved road in front of a predetermined distance from the position of the vehicle M (step S100). When there is a curved road, the driving assistance device 100 determines whether or not the curved road is a curved road that satisfies a condition (step S102). When the curved road is a curved road that satisfies the condition, the driving assistance device 100 determines whether or not a speed of the vehicle M satisfies a condition (step S104). If the determination of step S100, S102, or S104 is negative, the process of one routine of the present flowchart ends.

When the speed of the vehicle satisfies the condition, the driving assistance device 100 determines whether or not the vehicle M has reached a first position (for example, the position Pin FIG. 2) (step S106). When the vehicle M has reached the first position, the driving assistance device 100 provides a notification (step S108) and decelerates the vehicle M at a first deceleration degree (step S110).

Subsequently, the driving assistance device 100 determines whether or not the vehicle M has reached a second position (for example, the position P1 in FIG. 2) (step S112). When the vehicle M has reached the second position, the driving assistance device 100 performs a first warning (step S114). Subsequently, the driving assistance device 100 determines whether the vehicle M has reached a third position (for example, the position P2 in FIG. 2) (step S116).

When the vehicle M has reached the third position, the driving assistance device 100 performs a second warning (step S118) and decelerates the vehicle M at a second deceleration degree (step S122). Subsequently, it is determined whether or not the speed of the vehicle M has reached the target speed (step S122). When the speed of the vehicle M has not reached the target speed, the process returns to step S118. When the speed of the vehicle M has reached the target speed, the driving assistance device 100 stops the deceleration of the vehicle M (step S124). Thereby, the process of one routine of the present flowchart ends.

As described above, the driving assistance device 100 can assist the driver so that the vehicle M can travel more smoothly on the curved road by executing assistance control (steps S106 to S124) when the vehicle M and the curved road satisfy a condition.

In the process of the above-described flowchart, when the brake override or accelerator override is established, the assistance control is stopped.

[Control in Case where there is Compound Curved Road]

The assistance controller 150 controls an operation of second assistance control on the basis of a first target segment in which assistance control (first assistance control) for a first curved road is executed, a second target segment in which assistance control (second assistance control) for a second curved road is executed, and a position of the vehicle M when an operation of stopping the assistance control has been performed during the assistance control in a case where the vehicle M is scheduled to travel on the first curved road and the second curved road located within a predetermined distance from the first curved road. "Located within a predetermined distance" indicates, for example, that the first curved road and the second curved road are located so that the first target segment and the second target segment overlap. For example, when there is an overlap segment in which the first target segment and the second target segment overlap, the assistance controller 150 starts the second assistance control when an operation of stopping the assistance control is performed in the overlap segment.

Information indicating whether or not the first curved road and the second curved road are within a predetermined distance (information indicating whether or not it is a compound curve), regions corresponding to the first curved road and the second curved road, and the like may be stored in the first map information 54 or the second map information 62 and the curve determiner 130 may determine regions of the compound curve and the curved road included in the compound curve on the basis of the curvature or shape of the curved road stored in the first map information 54 or the second map information 62. For example, the curve determiner 130 determines a road having a shape whose curvature changes to match or conform to a predetermined rule as one curved road. The curve determiner 130, for example, determines that a road changing in the order of first curvature, second curvature, and third curvature (in the order of large, small, and large curvatures) is a compound curve. The second curvature is curvature less than the first and third curvatures.

[Control During Compound Curve Driving (Part 1)]

The assistance controller 150 starts the assistance control for a first curved road C1 when the vehicle M has entered the first target segment not overlapping the second target segment, continues the assistance control for the first curved road C1 when the vehicle M has entered the overlap segment, and stops the assistance control for the first curved road C1 and starts the assistance control for the second curved road C2 when an operation of stopping the assistance control for the first curved road C1 has been performed in the overlap segment.

Figure 9:
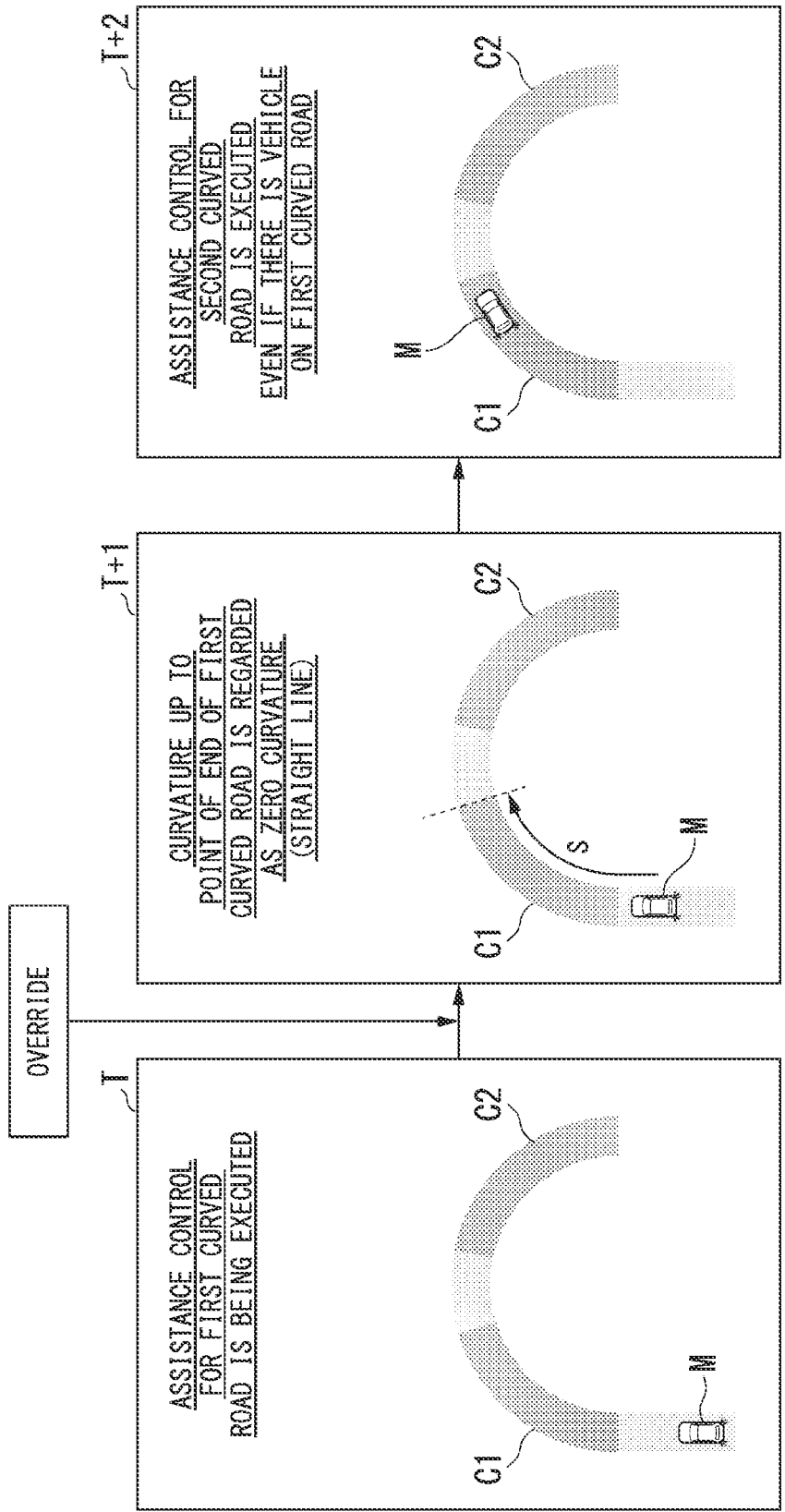
FIG. 9 is a diagram for describing control during compound curve driving.

FIG. 9 is a diagram for describing control during compound curve driving. At time T, because the vehicle M approaches the first curved road C1, the assistance controller 150 starts assistance control for the first curved road C1. Thereafter, the driver performs an accelerator override and stops the assistance control. The stop of the assistance control may be a brake override or an operation of a predetermined operation button.

Figure 10:
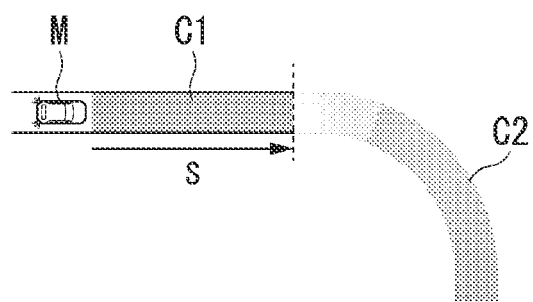
FIG. 10 is a diagram for describing a process of recognizing curvature as zero curvature (a straight line).

At time T+1, the assistance controller 150 regards a segment S from a position where an operation of stopping the assistance control has been performed (or a position where the assistance control has been stopped) to an end of the curved road C1 (for example, a point whose curvature is less than or equal to a threshold value) as a segment having zero curvature (a straight line) as shown in FIG. 10. As shown in FIG. 9, if the vehicle M reaches a start position of the assistance control for the second curved road C2 at time T+2, the assistance controller 150 executes assistance control for the second curved road C2 even if the vehicle M is located on the first curved road C1.

For example, when the assistance control for the first curved road C1 is being executed, the driver may not recognize the second curved road C2 even if the assistance control is stopped in the driver's operation. For this reason, the assistance controller 150 operates the second assistance control even if the first assistance control is stopped. For example, when the second assistance control is started after the vehicle exits the first curved road C1, the second assistance control may not be appropriately performed when the first curved road C1 is close to the second curved road C2. For example, it may not be possible to perform a gradual warning or deceleration.

On the other hand, in the present embodiment, because the assistance controller 150 executes the second assistance control even if the driver stops the assistance control, the driver can reliably recognize the second curved road C2 and appropriately perform the second assistance control.

[Control During Compound Curve Driving (Part 2)]

When an operation of stopping the assistance control has been performed in the overlap segment, the assistance controller 150 may start assistance control for the second curved road C2 a set time after the above-described operation is performed.

Figure 11:
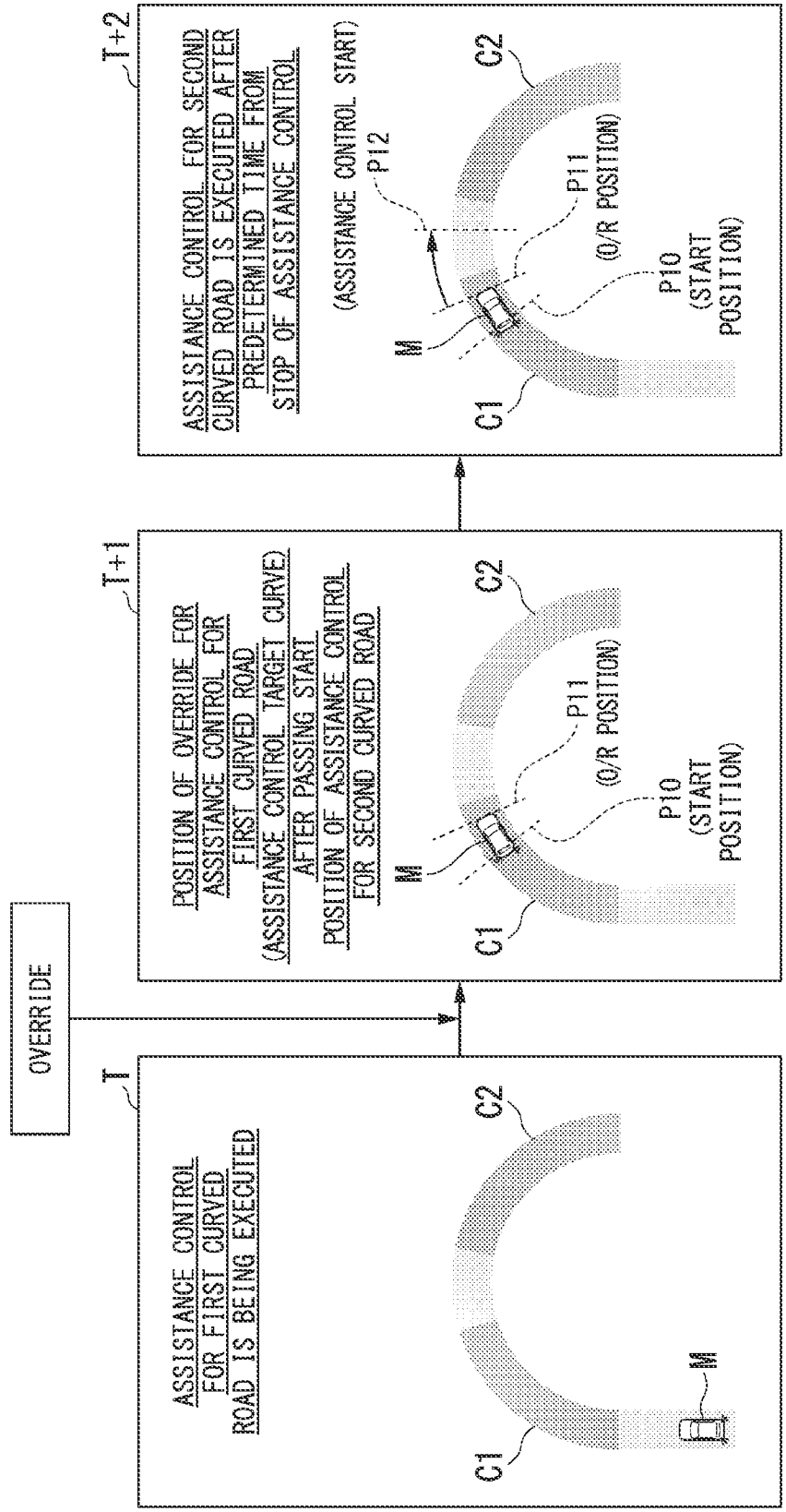
FIG. 11 is a diagram for describing control during compound curve driving.

FIG. 11 is a diagram for describing control during compound curve driving. At time T, because the vehicle M approaches the first curved road C1, the assistance controller 150 starts the first assistance control. Subsequently, the driver performs an accelerator override and stops the assistance control.

At time T+1, the assistance controller 150 is at a position P11 where the first assistance control has been stopped (or a position where the stop operation has been performed) after passing a position P10 where the second assistance control starts. In this case, after the elapse of a predetermined time from the position P11 or after the vehicle M travels a predetermined distance, the assistance controller 150 starts the second assistance control. The predetermined time is, for example, a predetermined short time such as 0.5 sec or 1 sec.

For example, if the second assistance control continues even if the first assistance control is stopped, the driver may mistakenly believe that the override on the first curved road C1 has not been completed and attempt to re-override. This re-override becomes an override of the second assistance control and the second assistance control may not be performed appropriately.

On the other hand, in the present embodiment, because the assistance controller 150 starts the second assistance control after the elapse of a predetermined time from the time when the stop operation has been performed or the time when the assistance control has been stopped by the driver or after the vehicle M travels a predetermined distance, it is possible to appropriately notify the driver of the start of the second assistance control and appropriately perform the second assistance control.

In the above-described process, when the second assistance control is started, the assistance controller 150 may notify that the second assistance control is started via the HMI 30. Furthermore, when this notification is made, the above-described predetermined time may be shortened as described above or the predetermined time may be omitted and the second assistance control may be started after the first assistance control is stopped.

[Suppression of Acceleration]

In the above process, the assistance controller 150 accelerates the vehicle at a second acceleration degree less than the first acceleration degree in a case where the driver has performed the acceleration operation of the first operation degree on the operation element after an operation of stopping the assistance control during the assistance control is performed and the assistance control is stopped when the vehicle M is scheduled to travel on a curved road (third curved road) where another curved road is not located within a predetermined distance. The assistance controller 150 accelerates the vehicle M at a third acceleration degree less than the second acceleration degree or prevents the vehicle M from accelerating in a case where the driver has performed the acceleration operation of the first operation degree on the operation element after an operation of stopping the assistance control during the assistance control is performed and the assistance control is stopped when the vehicle M is scheduled to travel on the first curved road and the second curved road located within a predetermined distance from the first curved road.

Figure 12:
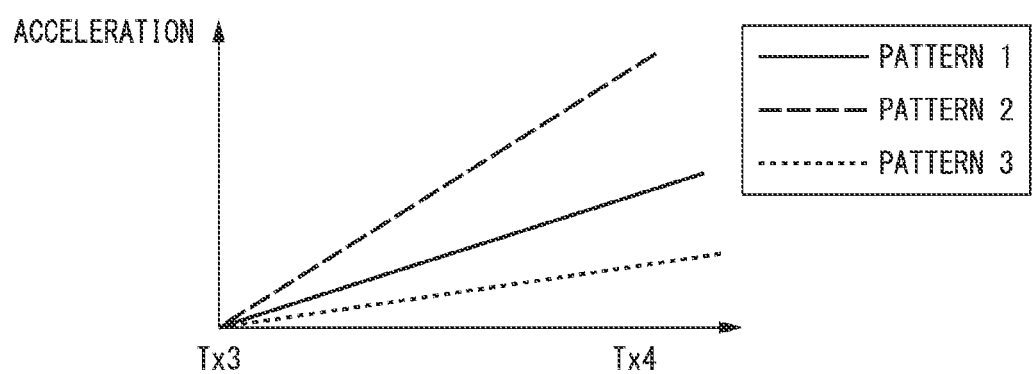
FIG. 12 is a diagram for describing an acceleration degree when assistance control is stopped.

The above-described third acceleration degree is an acceleration degree of pattern 3 that is lower than an acceleration degree of pattern 1 as shown in FIG. 12. FIG. 12 is a diagram for describing the third acceleration degree (the acceleration degree of pattern 3). Differences from FIG. 6 will be mainly described. As shown in FIG. 12, the acceleration degree of pattern 3 is lower than the acceleration degree of pattern 1 and the acceleration degree of pattern 2. If the acceleration operation of the first operation degree is performed in a case where the assistance control is not executed, the acceleration increases as in the change in the acceleration degree of pattern 2. If the accelerator override is established and the acceleration operation of the first operation degree is performed when the assistance control is executed in a case where the vehicle M travels on a curved road where the curved road is not continuous, the acceleration increases as in the change in the acceleration degree of pattern 1. If the accelerator override is established and the acceleration operation of the first operation degree is performed when the assistance control is executed in a case where the vehicle M travels on a compound curve, the acceleration increases as in the change in the acceleration degree of pattern 3.

As described above, the assistance controller 150 may decide on an amount of change in acceleration corresponding to an operation in accordance with a road on which the vehicle M is traveling. For example, in the case of traveling on the second curved road C2 after traveling on the first curved road C1, the assistance controller 150 suppresses the change in acceleration corresponding to the driver's operation as compared with other cases. Thereby, the deviation of the speed of the vehicle M from an appropriate speed is suppressed when the vehicle M travels on the second curved road C2.

[Specific Scene (1)]

When an operation of stopping the assistance control being executed in the first target segment not overlapping the second target segment has been performed, the assistance controller 150 stops the assistance control and starts assistance control for the second curved road when the vehicle M has entered the second target segment.

Figure 13:
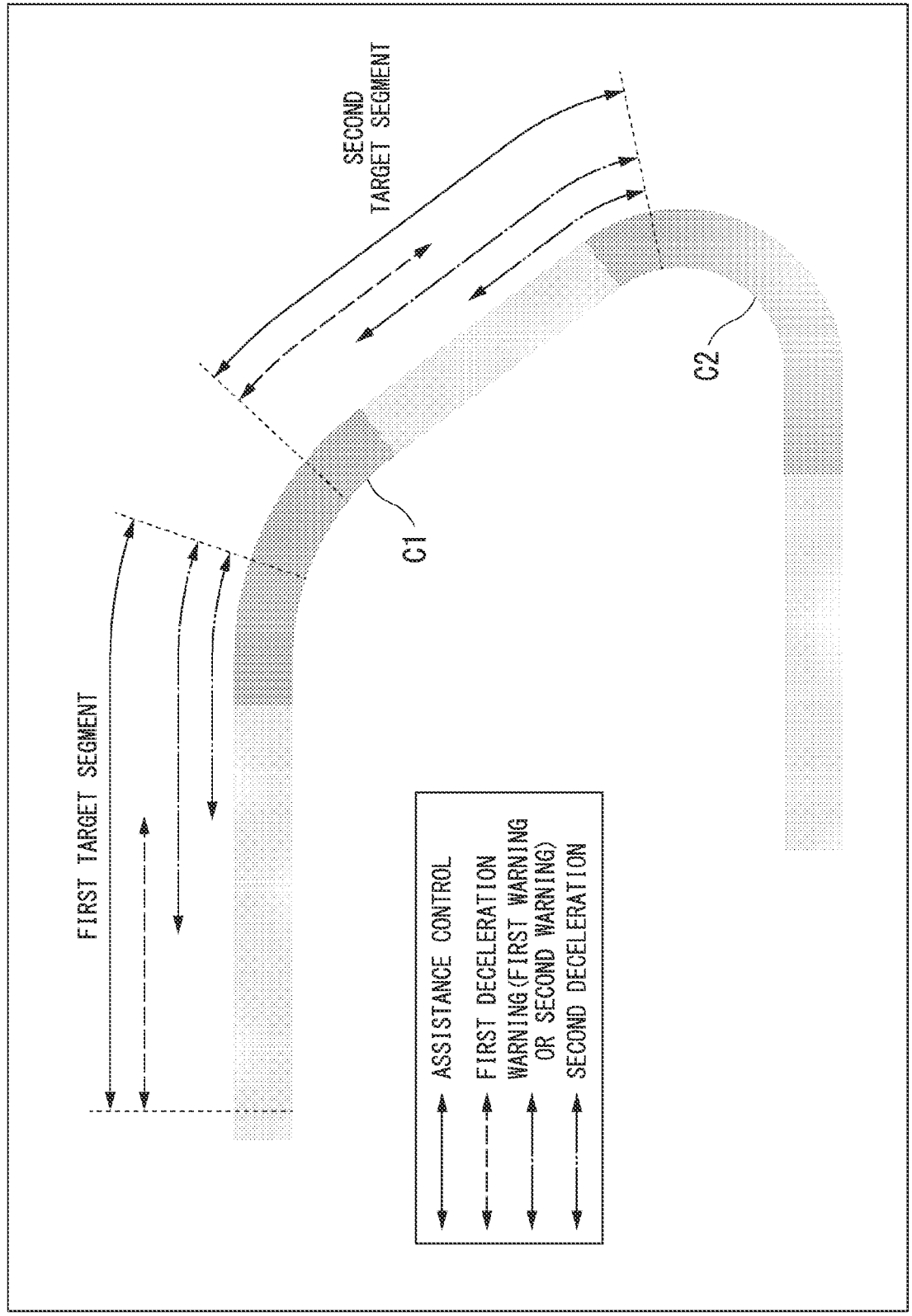
FIG. 13 is a diagram for describing a scene in which a first target segment and a second target segment do not overlap.

FIG. 13 is a diagram for describing a scene in which the first target segment and the second target segment do not overlap. In FIG. 13, the second target segment is included in the first curved road C1, but the first target segment and the second target segment do not overlap.

(1-1) When an operation of stopping the first assistance control has been performed in the first target segment, the assistance controller 150 stops the first assistance control.

(1-2) When the vehicle M enters the second target segment after the first assistance control is stopped or completed, the assistance controller 150 starts the second assistance control.

(1-3) When an operation of stopping the second assistance control has been performed in the second target segment, the assistance controller 150 stops the second assistance control.

When the first target segment and the second target segment do not overlap as described above, the assistance controller 150 controls the operation or stop of the assistance control in each segment.

[Specific Scene (2)]

Figure 14:
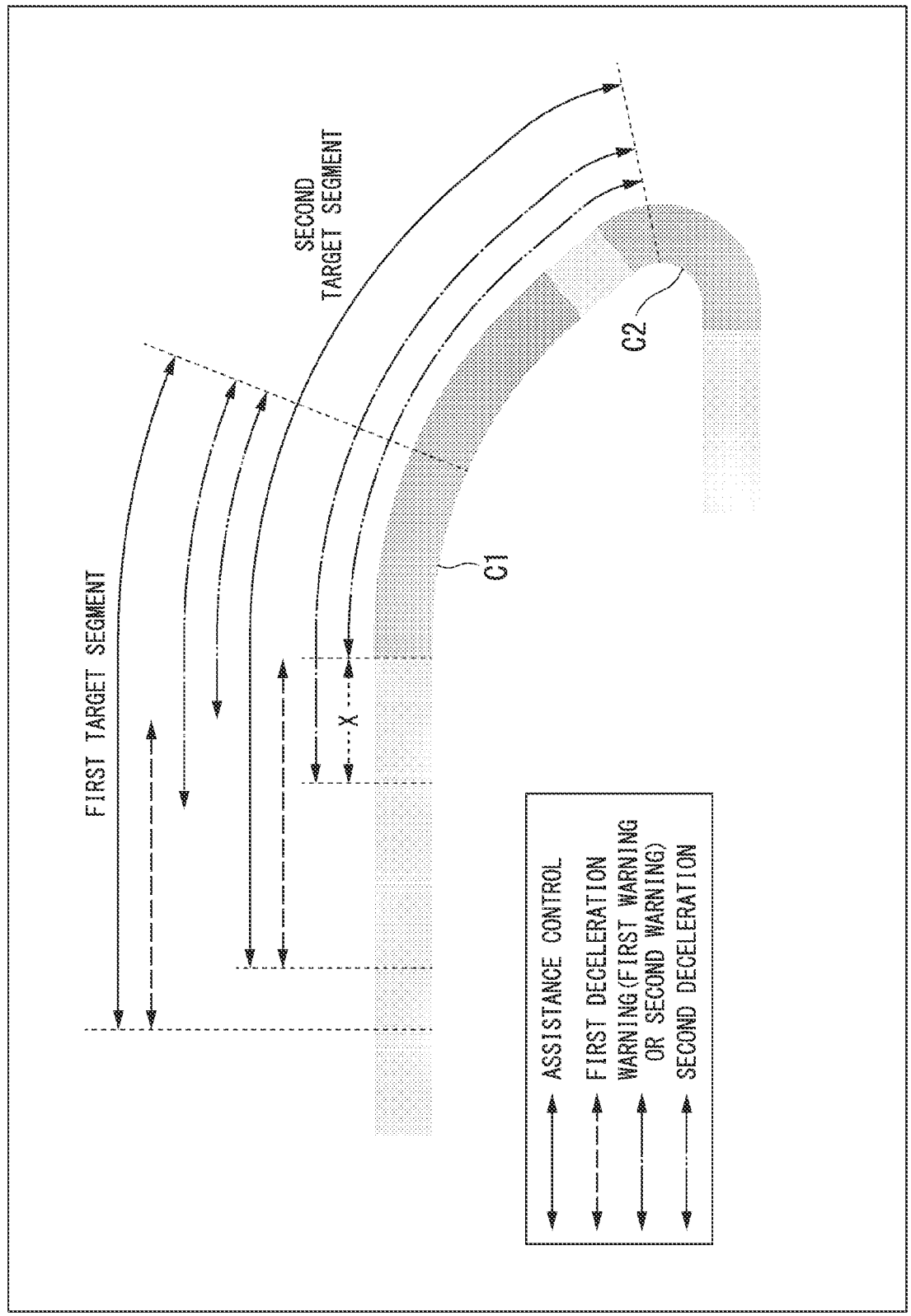
FIG. 14 is a diagram for describing a scene in which the first target segment and the second target segment overlap.

FIG. 14 is a diagram for describing a scene in which the first target segment and the second target segment overlap. In FIG. 14, the segment in which the first deceleration, warning, and second deceleration of the second assistance control are performed overlaps the first target segment.

When the operation of stopping the assistance control is not performed, the assistance controller 150 executes the first assistance control in the first target segment and starts the second assistance control in the second target segment after exiting the overlap segment. When the operation of stopping the assistance control is performed in this way, a control process is performed as follows.

(2-1) When an operation of stopping the first assistance control has been performed in the first target segment, the assistance controller 150 stops the first assistance control.

(2-2) When an operation of stopping the second assistance control has been performed in the second target segment not overlapping the first target segment, the assistance controller 150 stops the second assistance control even if the vehicle M is traveling on the first curved road C1.

(2-3) When an operation of stopping the assistance control has been performed in the overlap segment in which the first target segment and the second target segment overlap, the assistance controller 150 regards the operation as an operation of stopping the first assistance control, stops the first assistance control, and starts the second assistance control a predetermined time after the stop. For example, target control to be executed within the second assistance control is executed a predetermined time after the stop. For example, if the timing at which the first deceleration, warning, and second deceleration of the second assistance control are scheduled to be performed is after a predetermined time, the first deceleration, warning, and second deceleration of the second assistance control are performed. For example, when the timing at which the first deceleration and warning of the second assistance control are scheduled to be performed is after a predetermined time, the first deceleration and warning of the second assistance control are performed.

For example, in assistance control, a shape of a curve is displayed on the HMI 30. In the case of an S-shaped curve, the driver can easily recognize that a direction of the curve is an opposite direction and then the curve is present. However, when the curved road in the same direction is continuous, the display is not switched, and thus the second assistance control is started after a predetermined time as described above and the driver can easily recognize that it is the second assistance control for the next curved road.

In the above (2-3), when an operation of stopping the assistance control has been performed, a target whose start is stopped for a predetermined time may be a warning and the second deceleration may not be a target whose start is delayed for a predetermined time. For example, in the overlap segment, when an operation of stopping the first assistance control in the segment in which the second deceleration of the second assistance control has been performed is performed, the assistance controller 150 may start the warning of the second assistance control after stopping a warning sound for a predetermined time in a state in which the second deceleration is continued. For example, even if there is no change in deceleration, it is possible to appropriately control the speed of the vehicle M while allowing the driver to recognize the start of the second assistance control by stopping the warning sound.

The assistance controller 150 may stop the warning sound for a predetermined time when an operation of stopping the first assistance control has been performed in a segment (X in FIG. 14) in which the second assistance control is warned of other than the segment in which the second deceleration of the second assistance control is performed in the overlap segment and may start the second deceleration when a timing at which the second deceleration of the second assistance control starts is reached before the elapse of a predetermined time. Thereby, it is possible to appropriately control the speed of the vehicle M while allowing the driver to recognize the start of the second assistance control when the warning sound is stopped.

When an operation of stopping the assistance control has been performed in a segment in which a segment of the first deceleration of the first assistance control in the overlap segment and a segment of the first deceleration of the second target segment overlap, the assistance controller 150 stops the first deceleration for a predetermined time and then starts the second assistance control.

When the first target segment and the second target segment overlap as described above, the assistance controller 150 can appropriately control the behavior of the vehicle in accordance with the operation of the driver when the curved road continues by executing the second assistance control while allowing the driver to recognize the start of the second assistance control.

[Specific Scene (3)]

Figure 15:
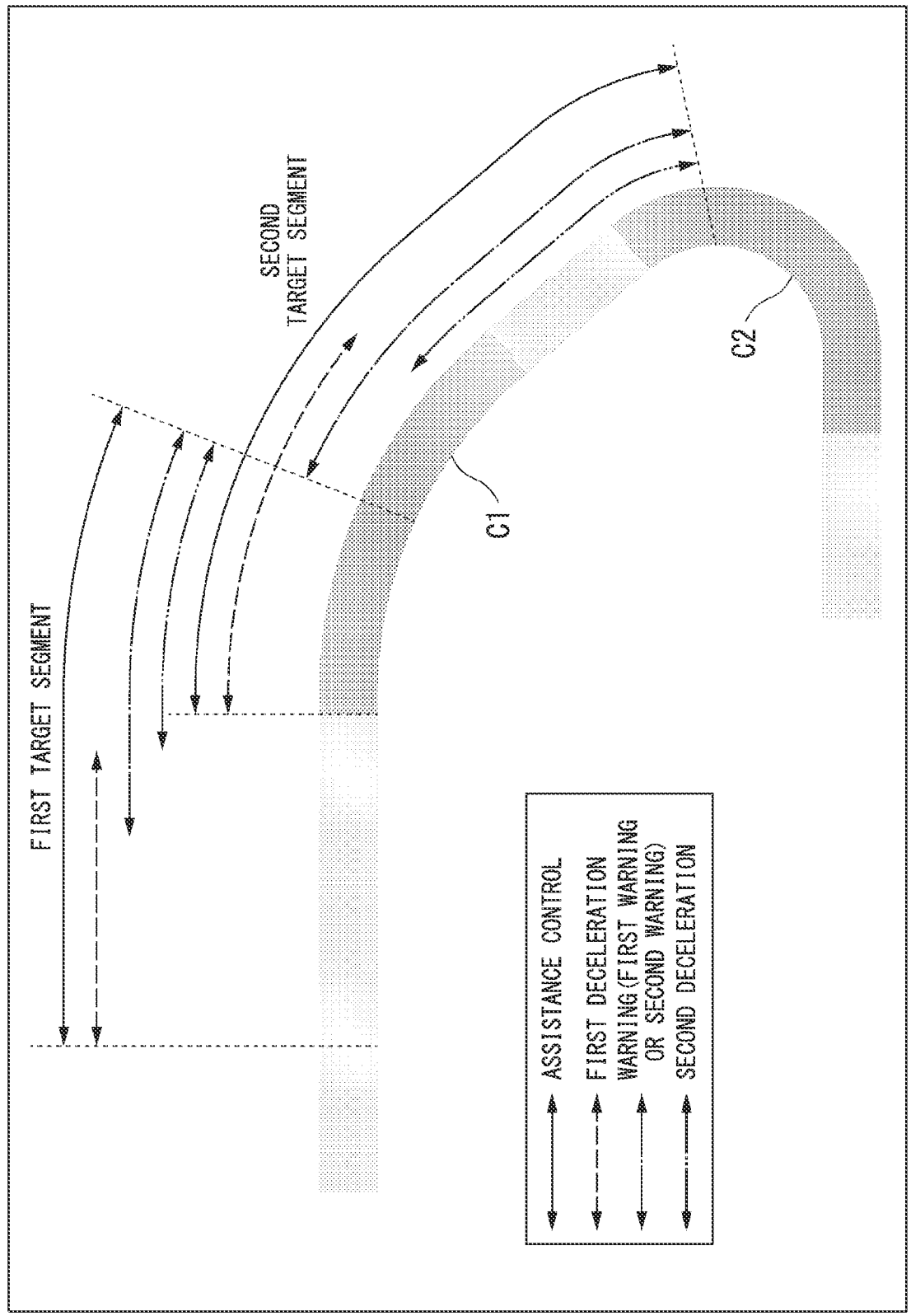
FIG. 15 is a diagram for describing a scene in which the first target segment and the second target segment overlap.

FIG. 15 is a diagram for describing a scene in which the first target segment and the second target segment overlap. In FIG. 15, a segment in which the first deceleration of the second assistance control is performed overlaps a segment in which the warning of the first assistance control or the second deceleration is performed. When an operation of stopping the assistance control has not been performed, the assistance controller 150 executes the first assistance control in the first target segment and starts the second assistance control in the second target segment after exiting the overlap segment. When the operation of stopping the assistance control has been performed in this way, it is controlled as follows.

(3-1) When an operation of stopping the first assistance control in the first target segment not overlapping the second target segment has been performed, the assistance controller 150 stops the first assistance control.

(2-2) When the vehicle M is traveling on the first curved road C1 and an operation of stopping the second assistance control has been performed in the second target segment not overlapping the first target segment, the assistance controller 150 stops the second assistance control.

(3-3) When an operation of stopping the assistance control has been performed in the segment corresponding to the first deceleration of the second assistance control, which is an overlap segment in which the first target segment and the second target segment overlap, the assistance controller 150 regards the operation as an operation of stopping the first assistance control, stops the first assistance control, and starts the second assistance control a predetermined time after the stop. As shown in FIG. 15, a target of the second assistance control in the overlap segment is the first deceleration. When the first assistance control has been stopped in this overlap segment, the assistance controller 150 starts the first deceleration of the second assistance control or the first deceleration and the warning after a predetermined time without performing the first deceleration of the second assistance control for a predetermined time.

In the above (3-3), when an operation of stopping the first assistance control in the segment corresponding to the first deceleration of the second assistance control which is an overlap segment has been performed, the assistance controller 150 may start the first deceleration of the second assistance control immediately or before the elapse of the predetermined time instead of starting the first deceleration of the second assistance control after the predetermined time as described above. In this case, because the deceleration is switched from the second deceleration of the first assistance control to the first deceleration of the second assistance control, the driver can recognize the transition to the second assistance control in a change in speed. Specifically, because the transition from relatively large deceleration to relatively small deceleration is performed, the driver can recognize the switching of assistance control.

When the first target segment and the second target segment overlap as described above, the assistance controller 150 can appropriately control the behavior of the vehicle in accordance with the driver's operation when the curved road is continuous by executing the second assistance control while allowing the driver to recognize the start of the second assistance control.

[Flowchart]

Figure 16:
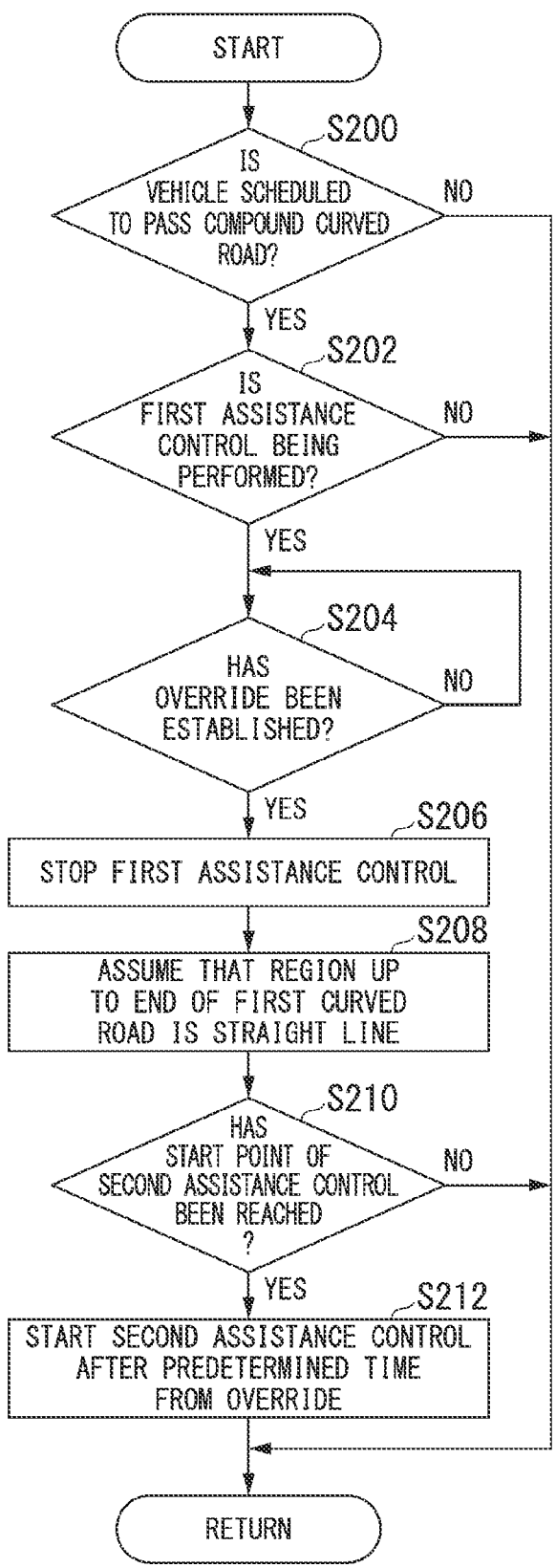
FIG. 16 is a flowchart showing an example of a flow of a process executed by an assistance controller.

FIG. 16 is a flowchart showing an example of a flow of a process executed by the assistance controller 150. Apart of the process of the present flowchart may be omitted or the order of processing steps may be changed as appropriate.

First, the assistance controller 150 determines whether or not the vehicle M is scheduled to pass a compound curve (step S200). When a compound curve is present, the assistance controller 150 determines whether or not the first assistance control is being executed (step S202). When the determination of step S200 or step S202 is negative, one routine of the present flowchart ends.

When the first assistance control is being executed, the assistance controller 150 determines whether or not an override has been established (step S204). When the override has been established, the assistance controller 150 stops the first assistance control (step S206). Subsequently, the assistance controller 150 identifies a position where the second assistance control starts on the assumption that a region from the position of the vehicle M to the end of the first curved road is a straight line (step S208).

Subsequently, the assistance controller 150 determines whether or not the vehicle M has reached a start position of the second assistance control (step S210). When the vehicle M has not reached the start position of the second assistance control, one routine of the present flowchart ends. When the vehicle M has reached the start position of the second assistance control, the assistance controller 150 starts the second assistance control after a predetermined time from an override (or stopping the first assistance control).

As described above, the assistance controller 150 can appropriately control the behavior of the vehicle in accordance with the driver's operation when the vehicle M travels on a compound curve.

According to the embodiment described above, the assistance controller 150 controls an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control, thereby appropriately controlling the behavior of the vehicle M in accordance with the driver's operation when the curved road continues.

The embodiment described above can be represented as follows.

A control device including:
a storage device storing a program; and
a hardware processor, the hardware processor executing the program stored in the storage device to:
a process of acquiring, curved road information about a curved road located in a travel direction of a vehicle;
while the vehicle is traveling in a segment from an entrance to the curved road to a position a predetermined distance before the entrance or while the vehicle is traveling on the curved road,
a process of performing assistance control which is one or both of deceleration control for decelerating the vehicle so that a speed of the vehicle approaches a target speed based on the curved road information and notification control for notifying that the speed of the vehicle approaches the target speed and stopping the assistance control when a driver has performed an operation of stopping the assistance control during the assistance control; and
a process of controlling an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:
a storage medium storing computer-readable instructions; and
one or more processors connected to the storage medium, the processor executing the computer-readable instructions to:
acquire curved road information about a curved road located in a travel direction of a vehicle;
while the vehicle is traveling in a segment from an entrance to the curved road to a position a predetermined distance before the entrance or while the vehicle is traveling on the curved road,
perform assistance control which is one or both of deceleration control for decelerating the vehicle so that a speed of the vehicle approaches a target speed based on the curved road information and notification control for notifying that the speed of the vehicle approaches the target speed and stop the assistance control when a driver has performed an operation of stopping the assistance control during the assistance control; and
control an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

2. The vehicle control device according to claim 1, wherein the processor executes the computer-readable instructions to:
start the assistance control for the second curved road when an operation of stopping the assistance control has been performed in an overlap segment in which the first target segment and the second target segment overlap when the overlap segment is present.

3. The vehicle control device according to claim 2, wherein the processor executes the computer-readable instructions to:
start the assistance control for the first curved road when the vehicle has entered the first target segment not overlapping the second target segment;
continue the assistance control for the first curved road when the vehicle has entered the overlap segment; and
stop the assistance control for the first curved road and start the assistance control for the second curved road when an operation of stopping the assistance control has been performed in the overlap segment.

4. The vehicle control device according to claim 3, wherein the overlap segment is a segment set on the first curved road.

5. The vehicle control device according to claim 1, wherein the processor executes the computer-readable instructions to:
stop the assistance control when an operation of stopping the assistance control being executed in the first target segment not overlapping the second target segment has been performed and start the assistance control for the second curved road when the vehicle has entered the second target segment.

6. The vehicle control device according to claim 1, wherein the processor executes the computer-readable instructions to:
when an operation of stopping the assistance control has been performed in an overlap segment in which the first target segment and the second target segment overlap, start the assistance control for the second curved road after the elapse of a predetermined time from the time when the operation has been performed or the time when the assistance control has been stopped or after the vehicle travels a predetermined distance.

7. The vehicle control device according to claim 1, wherein an operation of stopping the assistance control is an acceleration operation of the driver on an operation element, and
wherein the processor executes the computer-readable instructions to:
accelerate the vehicle at a first acceleration degree in a case where the driver has performed the acceleration operation of a first operation degree on the operation element when the assistance control is not being performed;
accelerate the vehicle at a second acceleration degree less than the first acceleration degree in a case where the driver has performed the acceleration operation of the first operation degree on the operation element after an operation of stopping the assistance control during the assistance control is performed and the assistance control is stopped when the vehicle is scheduled to travel on a third curved road where another curved road is not located within a predetermined distance; and
accelerate the vehicle at a third acceleration degree less than the second acceleration degree or prevent the vehicle from accelerating in a case where the driver has performed the acceleration operation of the first operation degree on the operation element after an operation of stopping the assistance control during the assistance control is performed and the assistance control is stopped when the vehicle is scheduled to travel on the first curved road and the second curved road located within a predetermined distance from the first curved road.

8. A vehicle control method to be executed by a computer, the vehicle control method comprising:
a process of acquiring curved road information about a curved road located in a travel direction of a vehicle;
while the vehicle is traveling in a segment from an entrance to the curved road to a position a predetermined distance before the entrance or while the vehicle is traveling on the curved road,
a process of performing assistance control which is one or both of deceleration control for decelerating the vehicle so that a speed of the vehicle approaches a target speed based on the curved road information and notification control for notifying that the speed of the vehicle approaches the target speed and stopping the assistance control when a driver has performed an operation of stopping the assistance control during the assistance control; and
a process of controlling an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

9. A non-transitory computer storage medium storing a program for causing a computer to execute:
a process of acquiring curved road information about a curved road located in a travel direction of a vehicle;
while the vehicle is traveling in a segment from an entrance to the curved road to a position a predetermined distance before the entrance or while the vehicle is traveling on the curved road,
a process of performing assistance control which is one or both of deceleration control for decelerating the vehicle so that a speed of the vehicle approaches a target speed based on the curved road information and notification control for notifying that the speed of the vehicle approaches the target speed and stopping the assistance control when a driver has performed an operation of stopping the assistance control during the assistance control; and
a process of controlling an assistance control operation for a second curved road on the basis of a first target segment in which the assistance control for a first curved road is executed, a second target segment in which the assistance control for a second curved road is executed, and a position of the vehicle when an operation of stopping the assistance control has been performed during the assistance control in a case where the vehicle is scheduled to travel on the first curved road and the second curved road located within a predetermined distance from the first curved road.

* * * * *